(12) United States Patent
Burke

(10) Patent No.: US 8,698,705 B2
(45) Date of Patent: Apr. 15, 2014

(54) COMPACT NEAR EYE DISPLAY WITH SCANNED IMAGE GENERATION

(75) Inventor: Elliot Burke, Goleta, CA (US)

(73) Assignee: Vuzix Corporation, Rochester, NY (US)

( * ) Notice: Subject to any disclaimer, the term of this patent is extended or adjusted under 35 U.S.C. 154(b) by 908 days.

(21) Appl. No.: 12/631,083

(22) Filed: Dec. 4, 2009

(65) Prior Publication Data

US 2011/0134017 A1    Jun. 9, 2011

(51) Int. Cl.
*G02B 27/01* (2006.01)

(52) U.S. Cl.
USPC .................................................. 345/7; 345/8

(58) Field of Classification Search
None
See application file for complete search history.

(56) References Cited

U.S. PATENT DOCUMENTS

| 8,059,342 | B2 * | 11/2011 | Burke | 359/630 |
| 2004/0174348 | A1 | 9/2004 | David | |
| 2008/0136742 | A1 * | 6/2008 | Tegreene et al. | 345/7 |

FOREIGN PATENT DOCUMENTS

| JP | 2001-305476 A | 10/2001 |
| JP | 2002-162598 A | 7/2002 |
| JP | 2006-350129 A | 12/2006 |
| WO | WO 2007031986 A2 * | 3/2007 |

OTHER PUBLICATIONS

PCT—Notification of Transmittal of the International Search Report and the Written Opinion of the International Searching Authority, or the Declaration; dated Jul. 27, 2011 (2 pages).
PCT—International Search Report in corresponding International Patent Application No. PCT/US10/57023; dated Jul. 27, 2011 (3 pages).
PCT—Written Opinion of the International Searching Authority in corresponding International Patent Application No. PCT/US10/57023; dated Jul. 27, 2011 (3 pages).

* cited by examiner

*Primary Examiner* — Joseph Haley
(74) *Attorney, Agent, or Firm* — Brian B. Shaw, Esq.; Thomas B. Ryan; Harter Secrest & Emery LLP

(57) ABSTRACT

A compact near eye display generates image segments for a first dimension of an intended image. Each of the image segments is transformed into angularly distinguished beamlets that converge through a first dimension pupil within an eyebox. A scanning optic angularly separates the angularly distinguished beamlets of different image segments for creating a second dimension pupil. The angularly distinguished and separated beamlets propagate along a waveguide in a form that minimizes the thickness of the display in front of a viewer's eye and limits the overall size of the optics required to support the projection of virtual images into the viewer's eye.

20 Claims, 4 Drawing Sheets

COMPACT NEAR EYE DISPLAY WITH SCANNED IMAGE GENERATION

TECHNICAL FIELD

The invention relates to near eye displays for projecting virtual images into viewers' eyes including such displays that generate at least one dimension of the images by optical scanning and such displays that include waveguides for conveying image information to the viewers' eyes in a compact form.

BACKGROUND OF THE INVENTION

Scanning mirrors operated in synchronism with modulated light sources have been used for generating images that are projected onto viewing screens. Typically, the scanning mirrors are incrementally inclined in synchronism with the output of the modulated light sources for writing raster traced images onto the viewing screens in accordance with video signals. Two-dimensional scanning mirror systems (e.g., mirrors rotatable about two orthogonal axes) can be used in combination with synchronized light sources (usually lasers) for generating two-dimensional images. Alternatively, one-dimensional scanning mirror systems (e.g., mirrors rotatable about a single axis) can be used in combination with synchronized one-dimensional image generators (e.g., linear arrays) for generating two-dimensional images.

Reluctance based on perceived safety concerns and image quality persists to projecting images written by laser beams directly into viewers' eyes as required for forming virtual images with near eye displays. Laser light is also prone to speckle, which can degrade the images. However, scanning mirrors have been used in conjunction with linear arrays of light-emitting diodes for generating virtual raster scan images that are projected directly into viewers' eyes. For example, a scanning mirror can be located in a viewer's line of sight and oriented for redirecting the generated beams, nominally through right angles, on paths into the viewer's eyes. These near eye displays with in-line scanning mirrors include large focusing optics for filling the mirrors and tend to be quite thick and otherwise cumbersome for mounting on viewers' heads as eyeglasses, headbands, or helmet attachments.

SUMMARY OF THE INVENTION

The invention, among its preferred embodiments, features a compact near eye display that generates image segments for a first dimension of an intended image and conveys an angular transform of the image segments along a waveguide toward a viewer's eye in a form that minimizes the thickness of the display in front of the viewer's eye and limits the overall size of the optics required to support the projection of virtual images into the viewer's eye. A scanning optic can be arranged to receive the angularly transformed image segments of the first dimension of the intended image and to angularly separate the transformed image segments in a second dimension of the intended image for propagation along the waveguide. The angularly distinguished image segments can be conveyed along the waveguide in a compact form to a position in front of a viewer's eye and an exit coupling of the waveguide can redirect the image segments into the viewer's eye as a virtual image.

The virtual image can be generated by one or more scanning optics combined with a single pixel source or with a multi-pixel pattern generator, such as a linear array of light-emitting diodes (LEDs) or illuminated liquid crystal display (LCD) elements. Light representing one or more points within the intended image and incident upon at least one of the scanning optics, e.g., a horizontal scanning mirror, is substantially collimated and is injected into the waveguide for further propagation along the length of the waveguide such as by internal reflection. The horizontal scanning optic varies the angle at which individual collimated beamlets of light propagate along the waveguide representing different pixel positions (e.g., horizontal positions within the intended virtual image). The exit coupling redirects the angularly related beamlets out of the waveguide on a path toward the viewer's eye.

Although the waveguide is preferably limited in thickness (i.e., depth) for more closely resembling the dimensions of conventional eyeglasses and is coupled to the horizontal scanning optic for propagating the horizontal dimension of the intended virtual image in a compact form, the waveguide can be sized in its remaining orthogonal dimensions to convey a vertical dimension of the intended virtual image to the same exit coupling in an uncompacted form. The vertical dimension of the intended image can be generated by a multi-pixel light source as a pattern generator, by a vertical scanning optic, or by some combination of the multi-pixel light source and the vertical scanning optic.

For example, an imaging optic can be arranged to form an image of the pixel light source midway between a focusing optic and the vertical scanning optic on a focal surface of the focusing optic. The pivoting of the vertical scanning optic in synchronism with a modulation of the pixel light source traces a vertical dimension of the intended virtual image as an intermediate image segment. The focusing optic collimates light from each of the pixels reproduced at the intermediate image segment. The horizontal scanning optic preferably interrupts the collimated output of the focusing optic and redirects the collimated light into the waveguide. The collimated light from the fully developed field of the vertical dimension (as a locus of angularly distinguished collimated beams) propagates along the waveguide in an uncompacted form through an exit coupling and converges through a vertical pupil filling a vertical dimension of an eyebox within which the viewer's pupil is intended to be positioned. The collimated light from the yet undeveloped field in the horizontal dimension is pivoted by the horizontal scanning optic in synchronism with the modulation of the pixel light source for forming a horizontal pupil for the horizontal dimension of the intended virtual image. The waveguide propagates the collimated light of the horizontal dimension in a compact form, effectively preserving the horizontal pupil in the horizontally compacted dimension through the exit coupling. By relating beam angle to exit position, the exit coupling can also be used to re-form or resize the horizontal pupil for the horizontal dimension within the intended eyebox.

Even if both the horizontal and the vertical dimensions of the virtual image are at least partially scanned into the viewer's eye, different horizontal and vertical optical functions are required to form the vertical and horizontal pupils for the two dimensions within the eyebox. The pixel light source, to the extent the light source represents one or more pixels of the generated image, functions as an object plane conjugate to virtual image presented to the viewer's eye. The imaging lens preferably relays an image of the pixel light source to the focal surface of the focusing optic. The vertical scanning optic, which interrupts the light path from the imaging lens to the focusing optic pivots in synchronism with the modulation of the pixel light source to generate the vertical dimension of the intended virtual image as an intermediate image segment on the focal surface of the focusing optic. The focusing optic collimates the light from each pixel as an individual beamlet and transforms the intermediate image segment into an array of angularly distinguishable beamlets that collectively converge through a vertical pupil through which the vertical dimension of the intended virtual image can be formed in the viewer's eye. In contrast, no intermediate image segment is generated for the horizontal dimension of the intended virtual image on the focal surface of the focusing optic. Instead, the horizontal scanning optic receives horizontally undifferentiated collimated light from the focusing optic and pivots in synchronism with the modulation of the pixel light source to form a horizontal pupil that is at least partially preserved by the waveguide for conveying horizontal dimension of the virtual image to the viewer's eye. The viewer's eye is relied upon to form the first horizontal dimension conjugate to the original pixel light source.

The total number of angular positions through which the intended virtual image is scanned can be reduced by forming the pixel light source as multi-pixel source, such as a linear (one-dimensional) array generating one dimension of the intended image or a two-dimensional array generating at least portions of both dimensions of the intended image. The total number of angular scan positions can be reduced by a factor of the number of pixels generated by the pixel light source. The number of pixels generated is preferably fewer than the total number of pixels in the desired virtual image in at least one dimension of the array to reduce the size of the optics required for projecting the virtual image into the viewer's eye.

If the pixel light source is in the form of a linear array, such as for generating the entire vertical dimension of the intended image, a single one-dimensional scanning optic can be used for generating the horizontal dimension of the virtual image. The pixel light source can be located at a focal distance from the focusing optic and a field lens can be used to compensate for the curvature of the focal surface of the focusing optic. A horizontal scanning optic interrupts the collimated output of the focusing optic for folding the angularly distinguishable collimated beams of the vertical dimension into the waveguide and for forming a horizontal pupil at the entrance of the waveguide. The collimated beamlets forming the vertical dimension of the intended image propagate within the waveguide without constraint to the exit coupling and converge through a vertical pupil at the eyebox. The collimated light beams forming the horizontal dimension of the intended image are at least partially constrained by the waveguide for preserving the horizontal dimension of the horizontal pupil along the waveguide to the exit coupling.

One version of a preferred compact near eye display for generating a virtual image includes a modulatable light source that generates one or more pixels of an intended image. A focusing optic angularly transforms a first dimension of the intended image through a first dimension pupil within an eyebox. A scanning optic directs the angularly transformed first dimension of the intended image into a waveguide for conveying the angularly transformed first dimension of the intended image to the first dimension pupil. The scanning optic is adjustable in synchronism with the modulatable light source for angularly forming a second dimension of the intended image within a second dimension pupil. The waveguide at least partially preserves the second dimension pupil so that the second dimension pupil as preserved sufficiently overlaps with the first dimension pupil within the eyebox so that the virtual image is viewable within the eyebox.

Another version of a preferred compact near eye display for generating a virtual image includes a linear image generator responsive to a control signal for generating successive lines along a first dimension of an intended image. A focusing optic transforms points along each of the successive lines into angularly distinguishable beamlets that converge through a first dimension pupil within an eyebox for viewing the intended image as a virtual image. A scanning optic is adjustable in synchronism with the linear image generator for angularly sweeping the successive lines along a second dimension of the intended image for creating a second dimension pupil. A waveguide conveys the angularly distinguishable beamlets toward the first dimension pupil and at least partially preserves the second dimension pupil so that the first and second dimension pupils sufficiently overlap within the eyebox so that the virtual image is viewable within the eyebox.

A version of the invention as a method of forming a virtual image with a near-eye display includes generating image segments for a first dimension of an intended image and transforming each of the image segments into angularly distinguished beamlets that converge through a first dimension pupil within an eyebox. The angularly distinguished beamlets of different image segments are angularly separated for creating a second dimension pupil. The angularly distinguished and separated beamlets are propagated along a waveguide having a limited thickness for preserving the second dimension pupil and are further propagated beyond the waveguide in a form at which the first and second dimension pupils overlap within the eyebox.

BRIEF DESCRIPTION OF THE DRAWING FIGURES

DETAILED DESCRIPTION OF THE INVENTION

Figure 1:
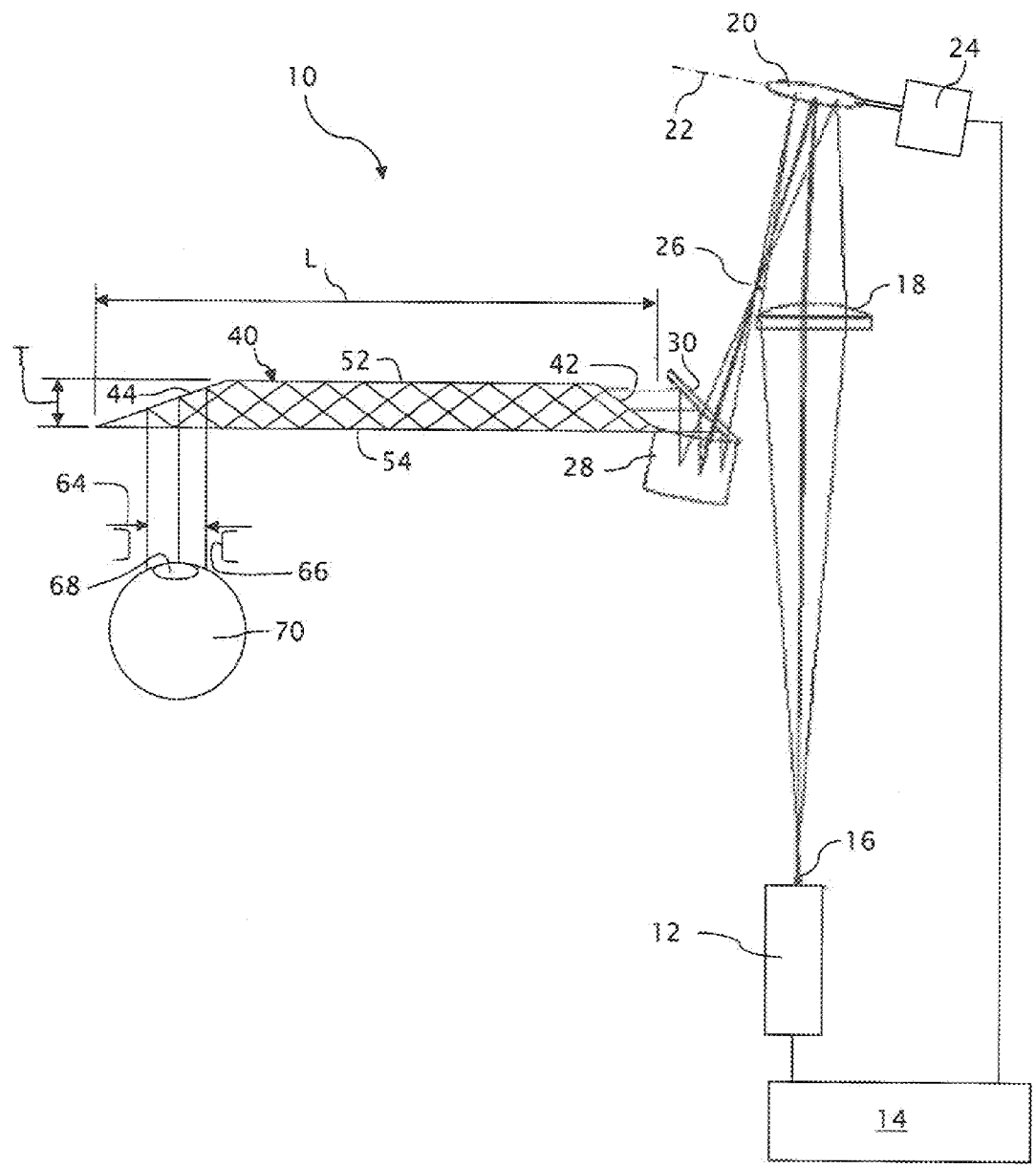
FIG. 1 is a plan view diagram of a compact near eye display system in showing the projection of a single image point in a horizontal plane with a two-dimensional scanning mirror system.
Figure 2:
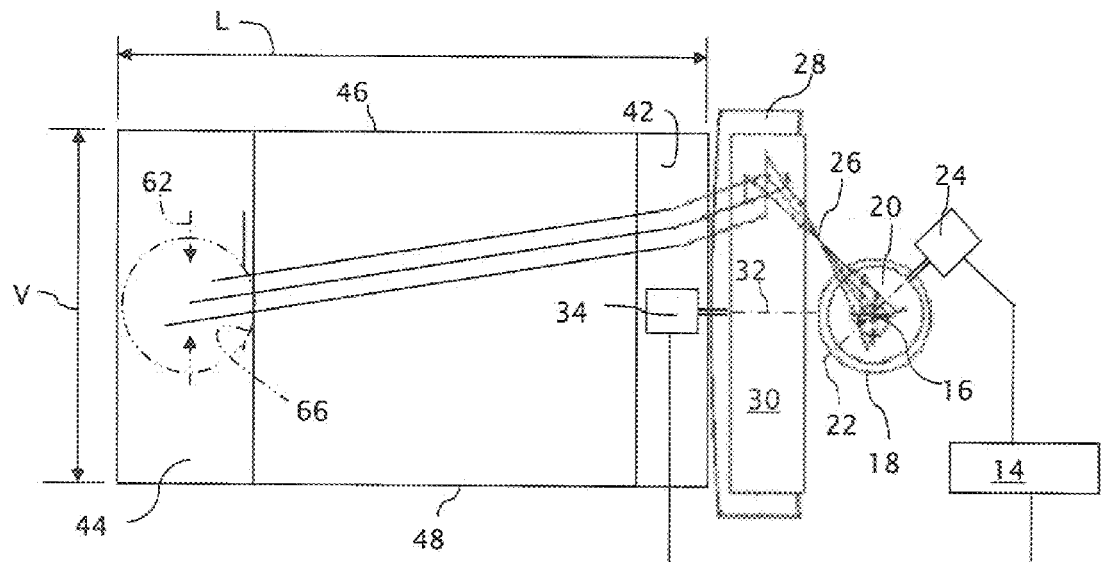
FIG. 2 is a front view diagram of the near eye display system showing the projection of the single image point in a vertical plane.
Figure 3:
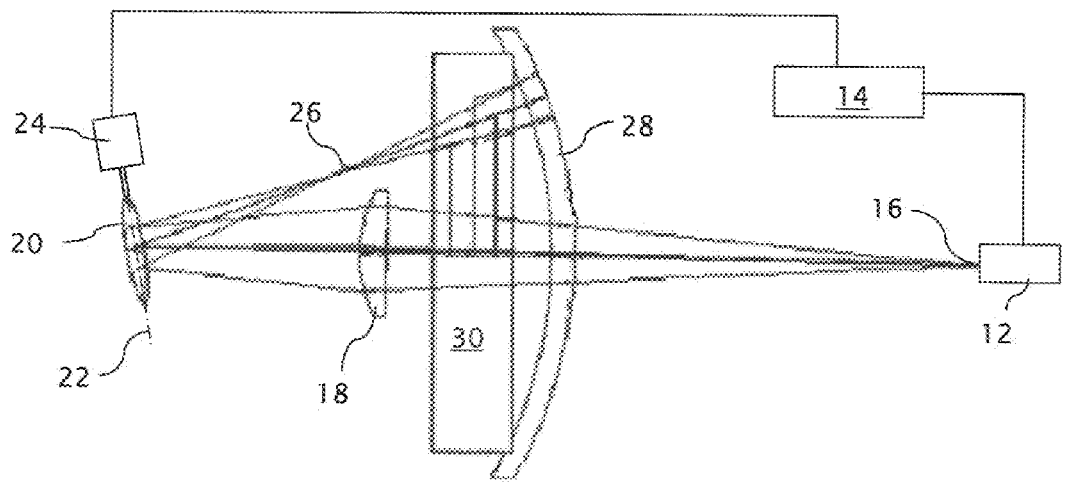
FIG. 3 is a side view diagram of the near eye display system showing the projection of the single image point in an orthogonal vertical plane.

A compact near eye display system 10 in accordance with the invention is shown in FIGS. 1-3 in a form that generates virtual images using a two-dimensional scanning system. A light source 12, which is preferably modulatable in both intensity and color, receives a video signal from a controller 14 for generating raster images. For producing color raster images, the light source 12 can be formed by a conventional white light source in combination with color filters or by a combination of different monochromatic light sources such as different color light emitting diodes (LEDs). Monochromatic raster images can be produced by a monochromatic light source modulatable in intensity alone.

The light source 12 preferably forms a point source 16 for generating a single point within the intended virtual image. An imaging optic 18, preferably in the form of a refractive lens, relays an image of the point source 16 to a focal surface 26 of a focusing optic 28, which preferably takes the form of a concave mirror. A first scanning optic 20, located at a distance equal to the focal distance of the focusing optic 28 from the focal surface 26, scans about a horizontal axis 22 in synchronism with the modulation of the light source 12 for tracing vertical scan lines of the intended image on the focal surface 26 of the focusing optic 28. Although the vertical scan lines overlap along the same arc of the focal surface 26, the scan lines may be understood to trace a vertical dimension of the intended virtual image as a conjugate intermediate image segment on the focal surface 26. The first scanning optic 20 is preferably operated by a servo drive 24 that is linked to the controller 14 for coordinating the modulation of the light source with the vertical scan position of the scanning optic 20.

Preferably, the first scanning optic 20 is formed by a plane mirror that is pivotable about the horizontal axis 22 under the control of a servo motor of the servo drive 24. However, compound refractive, electro-optic diffractive, or other types of beam-steering devices could also be used. The imaging and focusing optics 18 and 28 could also take different forms as is known in the art including various, refractive, reflective, and diffractive forms.

The focusing optic 28 extends in the vertical plane as shown in FIGS. 2 and 3 for angularly transforming the vertical dimension of the intermediate image segment, i.e., the vertical scan lines on the focal surface 26, through a vertical dimension pupil 62 within an eyebox 66 for viewing the intended image as a virtual image. The eyebox 66 is expected to measure between approximately 8 millimeters and 40 millimeters in diameter. A pupil 68 of a viewer's eye 70 is positioned within the eyebox 66. The focusing optic 28 converts images of the point source 16 traced onto the focal surface 26 into collimated beamlets that are angularly distinguished according to the vertical positions of the point source images on the focal surface 26.

A second scanning optic 30, which scans about a vertical axis 32 in synchronism with the modulation of the light source 12, forms a second dimension of the intended image as angularly distinguished beamlets within a horizontal dimension pupil 64. The resulting virtual image within the viewer's eye 70 is preferably the only conjugate of the point source 16 for constructing the horizontal dimension of the intended image. In other words, while an intermediate image segment is formed for the vertical dimension of the intended image, no corresponding intermediate image segment is formed for the horizontal dimension of the intended image. Similar to the first scanning optic 20, the second scanning optic 30 is preferably operated by a servo drive 34 that is linked to the controller 12 for coordinating the modulation of the light source with the scan horizontal position of the scanning optic 30.

The second scanning optic 30 is preferably both (a) selectively transparent for allowing light vertically steered by the first scanning optic 20 to reach the focusing optic 28 and (b) selectively reflective for horizontally steering light from the focusing optic 28 into a waveguide 40. The selectivity of the second scanning optic 30 can be based on a number of different factors including angle of incidence or polarization.

The waveguide 40, which provides for conveying light from an off-axis position (e.g., an eyeglass temple) to the viewer's eye 70, includes an entrance coupling 42 through which light enters the waveguide 40 and an exit coupling 44 through which light exits the waveguide 40. Overall, the waveguide 40 has an extended length dimension "L" for propagating light between the entrance and exit couplings 42 and 44 and has an extended vertical dimension "V" between top and bottom surfaces 46 and 48 sufficient to allow the scanned vertical dimension of the intended image to propagate without interruption between the entrance and exit couplings 42 and 44. However, the waveguide 40 has a limited thickness dimension "T" between anterior and posterior surfaces 52 and 54 to confine the scanned horizontal dimension of the intended image.

Preferably, the angularly distinguished beamlets of the scanned horizontal dimension of the intended image propagate along the waveguide by total internal reflection (TIR) from the anterior and posterior surfaces 52 and 54 for physically confining the angularly distinguished beamlets and thereby preserving the horizontal dimension pupil 64 along the length "L" of the waveguide 40. The limited thickness "T" of the waveguide 40 enables the near eye display to more closely resemble the overall form of eyeglasses. In addition, the limited thickness "T" enables a reduction in one dimension of both the focusing optic 28 and the second scanning optic 30. In the horizontal dimension, the light is largely confined to the horizontal dimension pupil 64, which is largely preserved by the waveguide 40, and is not required to form an image outside the viewer's eye 70.

Preferably, the waveguide 40 is made of a transparent optical material such as optical glass or plastic for conveying the angularly related beamlets without significant loss of energy or change in form, and the anterior and posterior surfaces 52 and 54 are preferably formed as plane parallel surfaces for preserving the original angular relationships between the beamlets within the limited space between the surfaces 52 and 54. To facilitate total internal reflections, the anterior and posterior surfaces 52 and 54 can be surrounded by air, and the body of the waveguide 40 can be made of a high refractive index material including conventional optical glass (approximately 1.5) but preferably higher. Optical plastics, such as acrylic, polystyrene, and known copolymers can be used to other advantages. For example, such less expensive and lighter resin materials can be moldable for forming desired features into the waveguide 40 and for integrating the waveguide 40 into a larger structure, such as an eyewear frame and particularly a bridge.

The entrance and exit couplings 42 and 44 are shown as having a prismatic form but can take a number of other forms for guiding light into and out of the waveguide 40 including by means of integrated or appended structures operating by modes of refraction, reflection, or diffraction. Relief gratings or volumetric holograms can be used to particular advantage.

The second scanning optic 30 transmits light to the focusing optic 28, which transforms a vertical dimension of the intended image appearing within the focal surface 26 into angularly related beamlets, and reflects light from the focusing optic 28 into the waveguide 40 for propagating the angularly related beamlets along the waveguide 40 without interruption in the vertical dimension. Upon exiting the waveguide 40, the angularly related beamlets converge at the vertical dimension pupil 62 within the eyebox 66. The second scanning optic 30 also cooperates with the modulated light source to form the horizontal dimension of the intended image by angularly scanning the collimated beamlets about the vertical axis 32. For example, following each vertical scan by the first scanning optic 20, the second scanning optic 30 can be angularly indexed in the horizontal scan direction for completing a raster image within the viewer's eye 70. Alternatively, following each horizontal scan by the second scanning optic 30, the first scanning optic 20 can be angularly indexed in the vertical scan direction for completing a raster image within the viewer's eye 70. The first and second scanning optics 20 and 30 can be continuously or intermittently indexed together to complete the raster image. Each frame of the intended video image is preferably scanned within the integration interval of the viewer's eye 70. The horizontal dimension pupil 64, although formed at the second scanning optic 30, is preserved by the waveguide 40, which spatially confines the light in horizontal plane, i.e., prevents the angularly related beamlets from physically separating. The exit coupling 44 can also be arranged for reforming or expanding the horizontal dimension pupil within the eyebox 68. For example, the exit coupling 44 and be made sensitive to beam angle for controlling the positions along the length "L" of the waveguide 40 at which the different angle beamlets emerge from the waveguide 40. The exit coupling 44 is also preferably at least partially transparent to enable viewing of the ambient environment through the waveguide 40, separately or in combination with viewing the intended image.

Figure 4:
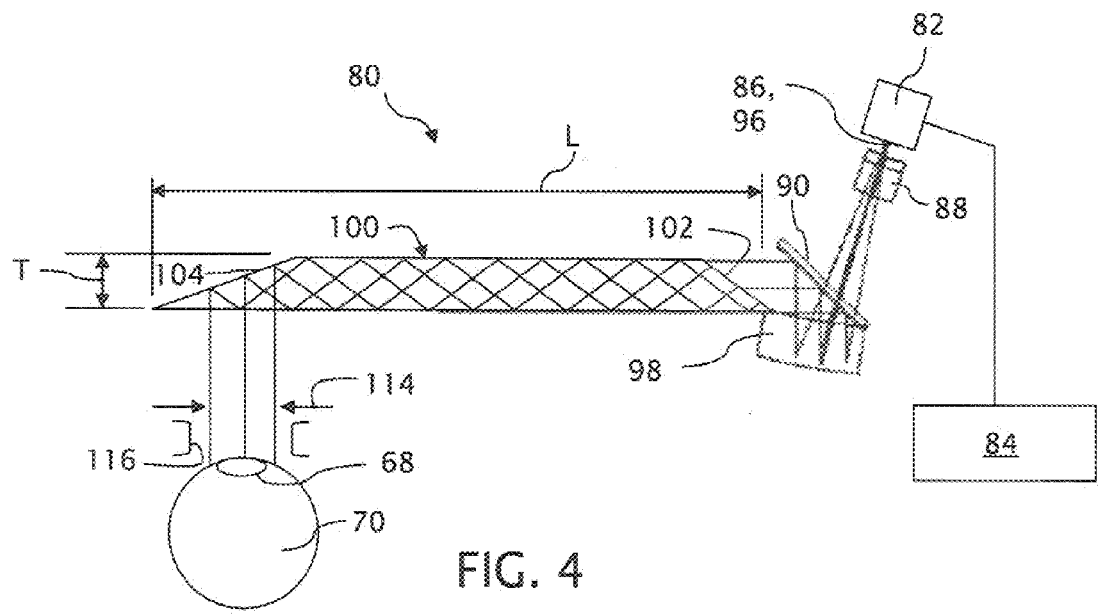
FIG. 4 is a plan view diagram of an alternative compact near eye display system in showing the projection of a single image point in a horizontal plane with a one-dimensional scanning mirror system in combination with a linear image source.
Figure 5:
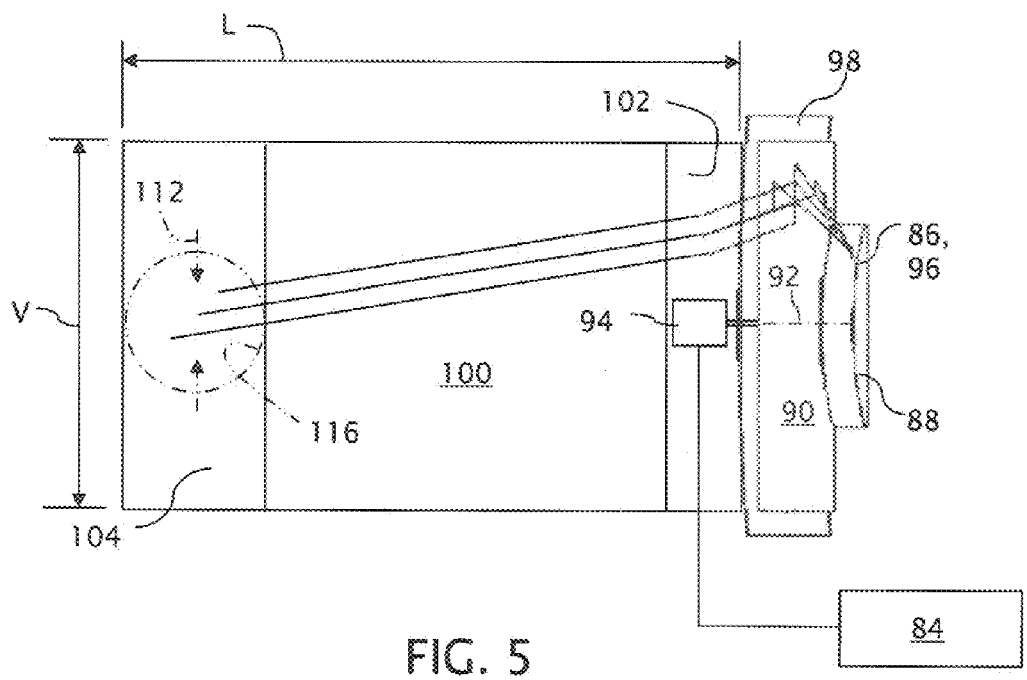
FIG. 5 is a front view diagram of the alternative near eye display system showing the projection of the single image point in a vertical plane.

FIGS. 4 and 5 disclose an alternative near eye display system 80 combining a linear image generator 82 with a one-dimensional scanning optic 90. The linear image generator 82, which can take the form of one or more rows of light emitting diodes, is connected to a controller 84 for generating a sequence of vertical lines of an intended image. The vertical lines are preferably formed by a row of point sources 86 that are collectively modulatable in both intensity and color similar to the single point source formed by the light source 12 of FIGS. 1-3. However, a video signal from the controller provides the linear image generator 82 with information for generating an entire vertical line of the intended image at once. Although the preferred image generator 82 includes a row of individually addressable light emitting diodes (LEDs), the image generator 82 could also include a row of illuminated liquid crystal display (LCD) elements, organic of inorganic Electro Luminescence (EL) display elements, or a grating light valve (GLV) array.

A field shaping lens 88 provides for effectively locating each of the generated vertical lines of the linear image generator 82 on a focal surface 96 of a focusing optic 98. Light from each point source 86 along the generated vertical line is collimated by the focusing optic 98 and angularly transformed into collimated beamlets that are angularly distinguished according to the positions of the point sources 86 along the vertical line. Thus, the vertical line of the linear image generator 82 as corrected by the field shaping lens 88 is arranged similar to the vertical scan lines traced on the focal surface 26 of the focusing optic 28 of FIGS. 1-3 for forming a an intermediate image segment.

Also similar to the preceding embodiment, scanning optic 90, which is both selectively transmissive and selectively reflective, transmits light to the focusing optic 98, which transforms a vertical dimension of the intended image as presented to the focal surface 96 into angularly related beamlets, and reflects light returning from the focusing optic 98 into a waveguide 100 for propagating the angularly related beamlets along the waveguide 100 without interruption in the vertical dimension. The scanning optic 90 also cooperates with the linear image generator 82 to form a horizontal dimension of the intended image by angularly sweeping the collimated beamlets about a vertical axis 92. For example, following the generation of each vertical line of the intended image and the injection of the angularly related beamlets into the waveguide 100, the scanning optic 90 can be angularly indexed in the horizontal scan direction by a servo drive 94 for completing a raster image within the viewer's eye 70.

While propagating along the waveguide 100, the angularly related beamlets converge in the vertical dimension towards a vertical dimension pupil 112 within an eyebox 116. However, the waveguide 100 constrains the angularly related beamlets in the horizontal dimension to preserve a vertical dimension pupil 114 associated with the scanning optic 90. Thus, while the vertical dimension of the intended image is formed at the linear image generator 82 and is angularly transformed through an opposite conjugate at the vertical dimension pupil 112, the horizontal dimension of the intended image is not formed outside the viewer's eye 70. Information for forming the horizontal dimension of the intended image only exists as its opposite conjugate within the horizontal dimension pupil 114.

Also similar to the preceding embodiment, the waveguide 100, which has a limited thickness "T" to prevent the angularly related beamlets from physically separating in the horizontal plane, includes entrance and exit couplings 102 and 104 that can take a variety of forms, including structures incorporated into the waveguide 100 or structures appended to the waveguide 100. The exit coupling 104 can also be arranged for reforming or resizing the horizontal dimension pupil formed within the eyebox 116.

Figure 6A:
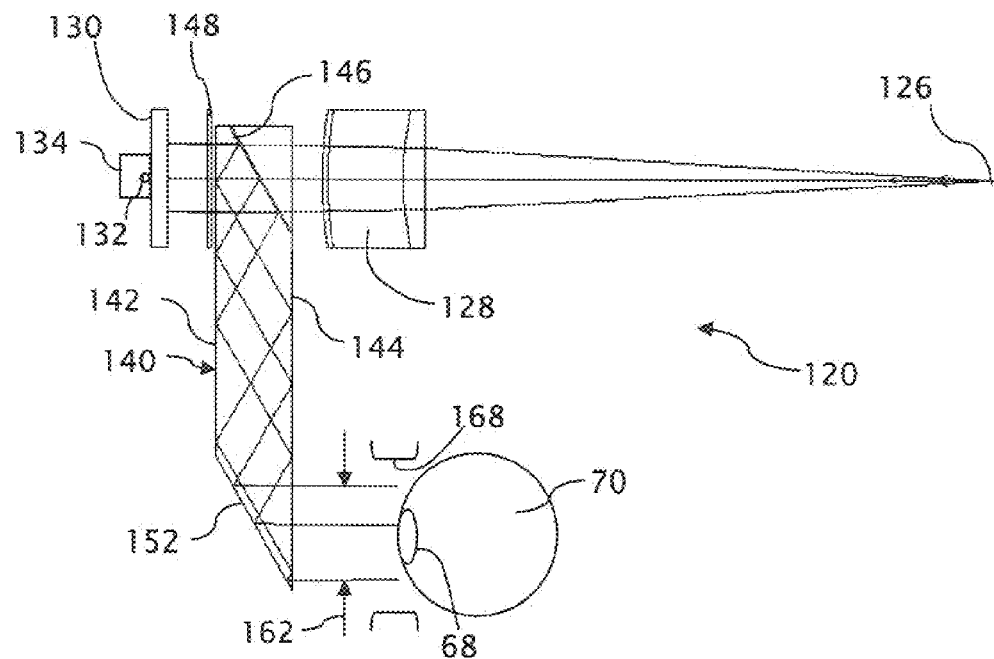
FIG. 6A is a plan view diagram of a second alternative compact near eye display system in showing the projection of a single image point in a horizontal plane with a one-dimensional scanning mirror system in combination with a linear image source.
Figure 6B:
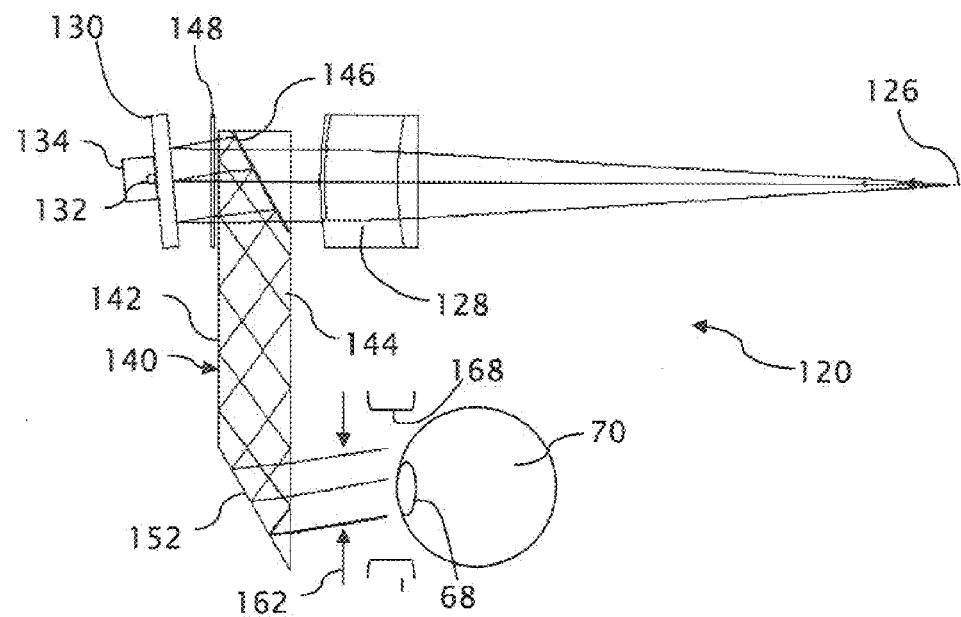
FIG. 6B is another plan view diagram of the second alternative compact near eye display system in showing the projection of a second single image point in a horizontal plane with a one-dimensional scanning mirror system in combination with a linear image source.

FIGS. 6A and 6B illustrate an alternative arrangement between a focusing optic 128, a scanning optic 130, and a waveguide 140 within a similar near eye display system 120 (only partially illustrated), each arranged for performing overall functions similar to the focusing optic 28, the scanning optic 30, and the waveguide 40 of FIGS. 1-3 and the focusing optic 98, the scanning optic 90, and the waveguide 100 of FIGS. 4 and 5. A vertical dimension of the intended image is formed at a focal surface 126 of the focusing optic 128, which, in contrast to the focusing optics 28 and 98, is a transmissive optic. However, similar to the preceding embodiments, the focusing optic 128 transforms light from point sources located along the vertical dimension of the intended image at the focal surface 126 into angularly related beamlets that converge through a vertical dimension pupil 162 within an eyebox 168.

Before the light from the focusing optic 128 enters the waveguide 140 for propagation by total internal reflection (TIR), the light from the focusing optic 128 (a) enters a posterior surface 144 of the waveguide 140, (b) transmits through a polarization beamsplitter 146, (c) exits an anterior surface 142 of the waveguide 140, (d) transmits through a quarter-wave plate 148, (e) reflects from the scanning optic 130, (f) retransmits through the quarter-wave plate 148, (f) enters the anterior surface 142 of the waveguide 140, and (g) reflects from the polarization beamsplitter 146 through a range of angles that propagate along a length of the waveguide 140. The beamsplitter 146 together with the quarter-wave plate 148 functions as an entrance coupling.

Upon entering the waveguide 140 from the focusing optic 128, a linearly polarized component of the light transmits through the polarization beamsplitter 146. The quarter-wave plate 148 converts the linearly polarized light from the polarization beamsplitter 146 into circularly polarized light approaching the scanning optic 130 and converts the circularly polarized light returning from the scanning optic 130 into linearly polarized light that is oriented orthogonal to the linearly polarized light transmitted by the polarization beamsplitter 146. The orthogonal linearly polarized light reflects from the polarization beamsplitter 146 through a range of angles subject to propagation along the waveguide 140 (e.g., a range of angles subject to total internal reflection between the anterior and posterior surface 142 and 144 of the waveguide 140). The range of angles at which the beamsplitter 146 reflects light along the waveguide 140 is controlled by the scanning optic 130. Under the control of a servo drive 134, the scanning optic 130 sweeps the light through the range of angles about a vertical axis 132. The scanning optic 130 is coordinated with the formation of the vertical lines of the intended image to complete a raster image by reproducing a succession of the vertical lines through different horizontal angular orientations. An exit coupling 154 redirects the angularly distinguished beamlets to the eyebox 168 within which the intended image is viewable as a virtual image.

FIG. 6A depicts the propagation of a point source for producing an image point within the center of the field of view in the horizontal plane, and FIG. 6B depicts the propagation of a point source for producing an image point at a periphery of the field of view in the horizontal plane. The two field points are angularly distinguished in the horizontal plane by the angular disposition of the scanning optic 130. The focusing optic 128, working on vertical segments of the image at the focal surface 126, angularly distinguishes the two field points in the vertical plane. Within the viewer's eye 70, the angular disposition of the field points is converted into relatively displaced image points of a virtual image.

Although the invention has been described with respect to particular embodiments, those of skill in the art will appreciate that the invention can be expressed in many other forms. For example, while in the embodiment of FIGS. 1-3 two scanning optics 20 and 30 contribute to forming a complete image starting from a single point source 16, two similar scanning optics could be arranged to similarly contribute a complete image starting from a one or two dimensional array of addressable point sources. The array of addressable point sources is preferably imaged onto the focal surface 26 of the focusing optic and the two scanning optics are angularly indexed through fewer but larger angular increments according to the dimensions of the array of addressable point sources. For example, a 20-by-20 array of point sources can be scanned 20 times faster than a single point source. Similarly, the linear image generator 82 can be arranged to simultaneously generate more than one vertical line of the intended image by including multiple rows of point sources.

Although in each instance the scanning optics are depicted as pivoting plane mirrors, the scanning optics could also be formed by micromirror arrays having pivoting mirror segments or other known beam steering devices including beam steering devices operating by modes other than reflection. For example, the scanning optics could be formed by relatively rotatable Risley prism pairs. Both the horizontal scanning optic and focusing optic could also be arranged together to operate in transmission leading to the waveguide.

The waveguide, which has been described as a plane parallel plate for propagating light in one dimension by total internal reflection, preferably remains of limited thickness but can take curvilinear shapes and can reflect light in the one dimension by other means including reflective coatings. In addition to the entrance and exit couplings, other optical structures can be formed along the length of the waveguide to perform various optical functions including compensating for non-plane parallel forms.

The invention claimed is:

1. A compact near eye display for generating a virtual image comprising:

a modulatable light source that generates one or more pixels of an intended image, the modulatable light participating in the formation of a first dimension of the intended image as a linear arrangement of pixels, a focusing optic that angularly transforms the first dimension of the intended image from the linear arrangement of the pixels to an angular arrangement of pixel beams converging through a first dimension pupil within an eyebox, a scanning optic that directs the angularly transformed first dimension of the intended image from the focusing optic into a waveguide for conveying the angular arrangement of pixel beams to the first dimension pupil, the scanning optic being adjustable in synchronism with the modulatable light source for angularly forming a second dimension of the intended image as an overlapping angular arrangement of the pixel beams within a second dimension pupil in advance of the eyebox, and the waveguide being arranged to at least partially preserve the second dimension pupil so that the second dimension pupil as preserved sufficiently overlaps with the first dimension pupil within the eyebox so that the virtual image is viewable within the eyebox.

2. The display of claim 1 further comprising an imaging optic that images the one or more pixels for generating a first dimension of the intended image as an intermediate image segment corresponding to the linear arrangement of the pixels.

3. The display of claim 2 in which the scanning optic angularly forms the second dimension of the intended image within the second dimension pupil without generating the second dimension of the intended image as an intermediate image segment.

4. The display of claim 3 in which the focusing optic has a focal surface and the imaging optic forms the intermediate image segment of the first dimension of the intended image on the focal surface of the focusing optic.

5. The display of claim 4 in which the scanning optic is a second of two scanning optics, and a first of the two scanning optics is adjustable in relation to the modulatable light source for tracing the intermediate image segment of the first dimension of the intended image on the focal surface of the focusing optic.

6. The display of claim 1 in which the modulatable light source includes a linear array of individually modulatable point sources corresponding to the linear arrangement of the pixels and further comprising a field lens for matching the linear array of individually modulatable point sources to the focal surface of the focusing optic.

7. The display of claim 1 in which the scanning optic is selectively transmissive for transmitting light from the imaging optic toward the focusing optic and selectively reflective for reflecting light from the focusing optic toward the waveguide.

8. The display of claim 7 in which the focusing optic includes a concave mirror for reflecting light from the scanning optic back toward the scanning optic.

9. The display of claim 1 in which the focusing optic transforms the imaged pixels of the intermediate image segment into collimated beamlets that are angularly distinguished within a first dimension of the intended image and the scanning optic angularly distinguishes the collimated beamlets within the second dimension of the intended image.

10. The display of claim 8 in which the waveguide has a length along which the collimated beamlets are propagated, a height within which the collimated beamlets within the first dimension converge toward the first dimension pupil, and a limited thickness for limiting spatial divergence of the collimated beamlets within the second dimension.

11. A compact near eye display for generating a virtual image comprising:
a linear image generator responsive to a control signal for generating successive lines along a first dimension of an intended image,
a focusing optic that transforms points along each of the successive lines into angularly distinguishable beamlets that converge through a first dimension pupil within an eyebox,
a scanning optic that is adjustable in synchronism with the linear image generator for angularly sweeping the angularly distinguishable beamlets from the focusing optic in a second dimension of the intended image for overlapping the angularly swept beamlets within a second dimension pupil in advance of the eyebox,
a waveguide that conveys the angularly distinguishable beamlets on converging paths toward the first dimension pupil and at least partially preserves the overlap of the angularly swept beamlets within the second dimension pupil so that the first and second dimension pupils effectively overlap within the eyebox so that the virtual image is viewable within the eyebox.

12. The display of claim 11 in which the scanning optic directs the angularly distinguishable beamlets into the waveguide.

13. The display of claim 12 in which the waveguide has a height dimension within which the angularly distinguishable beamlets converge toward the first dimension pupa and a thickness dimension that limits expansion of the second dimension pupil.

14. The display of claim 11 including a field lens that matches the successive lines of the linear image generator to a focal surface of the focusing optic.

15. The display of claim 11 in which the scanning optic receives the angularly distinguishable beamlets from the focusing optic.

16. The display of claim 15 in which the focusing optic includes a reflective optic that reflects the angularly distinguishable beamlets toward the scanning optic for a further reflection into the waveguide.

17. The display of claim 15 in which the scanning optic is partly transmissive for transmitting the angularly distinguishable beamlets toward the reflective focusing optic and partly reflective for reflecting the angularly distinguished beamlets from the focusing optic into the waveguide.

18. The display of claim 15 in which the focusing optic is a refractive optic that conveys the angularly distinguishable beamlets toward the scanning optic and the scanning optic reflects the angularly distinguishable beamlets into the waveguide.

19. A method of forming a virtual image with a near-eye display comprising steps of:
generating spatially distinguished image segments for a first dimension of an intended image,
transforming each of the spatially distinguished image segments into angularly distinguished beamlets that converge through a first dimension pupil within an eyebox,
angularly separating the angularly distinguished beamlets of different image segments for creating a second dimension pupil;
propagating the angularly distinguished and separated beamlets along a waveguide having a vertical dimension sufficient for propagating the angularly distinguished and separated beamlets on converging paths toward the first dimension pupil and having a limited thickness for preserving the second dimension pupil along the converging paths of propagation, and
further propagating the angularly distinguished and separated beamlets beyond the waveguide in a form at which the first and second dimension pupils overlap within the eyebox.

20. The method of claim 19 in which the step of generating image segments for a first dimension of an intended image includes generating the image segments on a focal surface of the focusing optic that transforms each of the image segments into the angularly distinguished beamlets.

* * * * *